(12) United States Patent
Hansen et al.

(10) Patent No.: US 6,196,105 B1
(45) Date of Patent: Mar. 6, 2001

(54) CUTTING ARRANGEMENT FOR CUTTING PAPER OR SHEET WEBS

(75) Inventors: Per Henrik Hansen, Hasselager; Ole Krener, Højbjerg, both of (DK)

(73) Assignee: Tetra Laval Food Hoyer A/S, Højberg (DK)

( * ) Notice: Subject to any disclaimer, the term of this patent is extended or adjusted under 35 U.S.C. 154(b) by 0 days.

(21) Appl. No.: 09/101,808

(22) PCT Filed: Feb. 24, 1997

(86) PCT No.: PCT/DK97/00083

§ 371 Date: Mar. 31, 1999

§ 102(e) Date: Mar. 31, 1999

(87) PCT Pub. No.: WO97/30828

PCT Pub. Date: Aug. 28, 1997

(30) Foreign Application Priority Data

Feb. 22, 1996 (DK) .................................................. 0197/96

(51) Int. Cl.[7] ...................................................... B26D 1/12
(52) U.S. Cl. .................................................. 83/677; 83/663
(58) Field of Search ........................... 83/677, 333, 663, 83/698.61, 346

(56) References Cited

U.S. PATENT DOCUMENTS

| 3,119,312 | * | 1/1964 | Henc | 83/333 |
| 3,165,954 | * | 1/1965 | Hunck | 83/346 |
| 3,251,256 | * | 5/1966 | McGrath | 83/677 |
| 3,288,013 | * | 11/1966 | Cochrane | 83/677 |
| 3,638,522 | * | 2/1972 | Bolli | 83/333 |
| 3,684,142 | * | 8/1972 | Jackson | 83/698.61 |
| 4,147,583 | * | 4/1979 | Deutschlander | 83/663 |
| 4,351,210 | * | 9/1982 | McKindary | 83/663 |
| 5,622,594 | * | 4/1997 | Lerner et al. | 83/333 |

* cited by examiner

*Primary Examiner*—M. Rachuba
*Assistant Examiner*—Omar Flores Sánchez
(74) *Attorney, Agent, or Firm*—Nixon Peabody LLP; David S. Safran

(57) ABSTRACT

A cutting tool having a cutter bar and the anvil with cooperating abutment portions (6, 9) at their ends. The knife edge is resiliently deformable and the abutment portions prevent damage to the knife edge resiliently under high cutting pressures.

6 Claims, 2 Drawing Sheets

CUTTING ARRANGEMENT FOR CUTTING PAPER OR SHEET WEBS

BACKGROUND OF THE INVENTION

1. Field of the Invention

The present invention relates to a cutting tool set for cutting paper or sheet webs, particularly for cutting off product packings by successive cutting through cross sealed areas of a tubular packing material with enclosed products such as edible ice bodies, comprising a knife with a sharp edge and means for pressing the knife against an anvil for cutting through an intermediate web.

2. Description of Related Art

In so-called flow packing systems, e.g. for packaging of ice lollies, the products are supplied with mutual spacing to an advanced paper or sheet web, which is currently folded about the products to form a tubular wrapping, this being currently closed by a length sealing and by cross sealing in the areas between the products. At the discharge end of the line a cutting of the web is effected through the cross sealed areas for successive separation of individual packings.

Normally, this cutting is effected by means of a knife and a backing anvil mounted on opposed rotary shafts, between which the sheet web is advanced. During the rotation the knife is forced against the anvil, whereby the web is cut. The knife may have a straight or an undulated cutting edge. The knife and/or the the anvil may be supported resiliently in the radial direction.

For achieving a safe cutting operation the knife should be positioned relative to the anvil with regard being had to the type and dimension of the web to be cut. Also, the pressure between the knife and the anvil should be adapted to this positioning and the said web conditions. If the pressure is too weak the knife may not cut the web entirely, e.g. leaving fibres in the cutting line uncut. On the other hand, if the cutting pressure is too high the cutting edge will be pressed flat, whereby the cutting ability is reduced. In order to counteract such a wear the knife and the anvil may be arranged resiliently relative to each other, but still it is difficult to ensure both an efficient cutting and a long lifetime of the knife. It is necessary to adjust the positions of the knife and the anvil very precisely for securing a safe cutting operation.

However, such an adjustment can be very time-consuming and troublesome, and on this background it is the purpose of the present invention to provide a cutting arrangement that will protect the cutting edge against deformtion and is easily adjustable to a desired pressure between the knife and the anvil.

SUMMARY OF THE INVENTION

According to the invention this is achievable by way of the opposite ends of the knife edge is shaped with shoulder portions for abutting corresponding abutment portions on the anvil, these cooperating parts having their interabutting surface sections located such that a full pressing together of the parts will result in only a slight, purely resilient deformation of the knife edge area as forced against the anvil. Advantage is here taken by the fact that the knife edge, within a certain limit, is pressure deformable in a purely resilient manner without this doing any harm to the sharp edge. By means of the indicated shoulder and abutment portions it will be ensured beforehand both that the knife can effectively engage the anvil for the cutting operation and that it cannot, on the other hand, be forced against the anvil so strongly as to undergo a permanent deformation. Due to the fact that this is secured purely locally already by the very shaping of the cooperating parts, there will be no need for any special adjustment of the mounting of the tool parts, and these will be remarkable for high efficiency and long duration.

In practice the possible resilient depressability of the cutting edge will be limited to a range of some 0.05 mm, i.e. a very short movement. For that reason it is also relevant to consider a possible compressability or resiliency of the heavier portions as constituted by the shoulder and abutment parts, inasfar as this should be taken into account in connection with the magnitude of the required actuation pressure if the tool parts are to be held reasonably small sized. Thus, it is possible to provide different sets of tools with uniform knife equipment for use in different pressure ranges, where, then, some part of the pressure deformation of the cutting edge will, to a higher or lower degree, be due to a further displacement after the shoulder and abutment faces having been brought to engage each other. The resiliency or yieldability of these faces can be modified, e.g. by a suitable material choice or by a formation of grooves in the surfaces. Moreover, such grooves will contribute to a more well defined deformation, because the grooves, during the cutting operation, will act as channels through which any possible dirt can be forced away. Likewise, it may be possible to design the shoulder face with different geometries, e.g. triangular or rectangular shapes for achieving this effect.

In mounting the knife or the anvil so as to be supported by a spring system, such that the force with which they are pressed together is established as a spring force, the actual force may be adjusted through a suitable choice of the resiliency of such a spring system.

The anvil may be provided with an unbroken surface, without any jump along the cutting line. In that case the edge deformation is predominantly defined by the level of the shoulder faces relative to that of thee knife edge.

Alternatively, the anvil can be made with a pair of shoulder portions, the positions of which in the cutting line corresponds to the shoulder faces on the knife element. This may be advantageous if, for example, the material choice for the elements of the cutting system is conditioned by other production conditions, such that a safe cutting is not necessarily ascertained by a cutting arrangement with a planar basis.

The knife edge may be designed as a straight edge or a zig-zag shaped or undulated edge, all according to the desired type of the cutting.

In a cutting arrangement according to the invention the knife and the anvil may be pressed together through rotary or translatoric movements or combinations thereof.

In the following the invention is described in more detail with reference to the drawings.

DETAILED DESCRIPTION OF THE INVENTION

Figure 1:
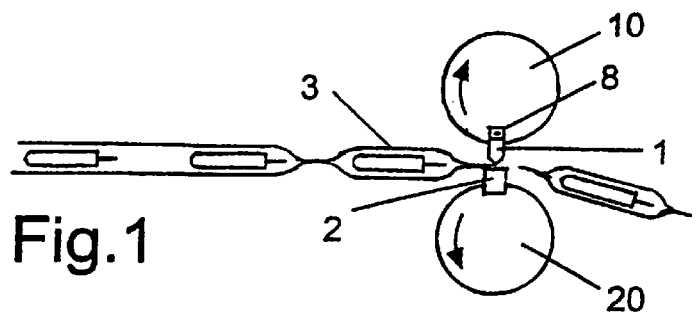
FIG. 1 is a schematic side view of a cutting arrangement.

In FIG. 1 a cutting arrangement is shown, comprising a knife 1 and an anvil 2 mounted in a rotary manner on a cutter cylinder 10 and a backing cylinder 20, respectively. A material web 3 is advanced between the two cylinders 10 and 20. In the embodiment shown this web 3 is tubular and contains ice products. Upstream of the cutting station the web has been subjected to cross sealing operations such that the ice products are present in respective tube cells, which are then cut free by cross cutting, resulting in bag members with one product in each. The knife 1 is mounted on the knife cylinder 10 backed by a spring arrangement 8.

Figures 2, 2A:
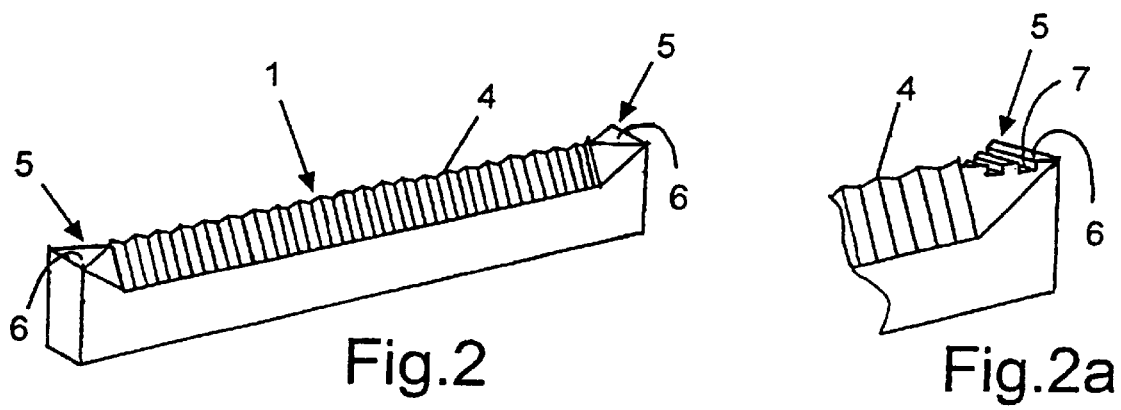
FIGS. 2 and 2a are perspective views of an associated knife with with shoulder faces.

A knife 1 belonging to a system according to the invention is shown in more detail in FIGS. 2 and 2a'. At opposite ends this knife is provided with shoulder formations 5. Each of these has a shoulder face 6 abutting against corresponding abutment faces 9 on the anvil 3, see FIGS. 3–5. Between the two shoulders 5 the knife 1 has a cutting edge 4, which may be a zigzag edge as illustrated or a straight edge. As shown in FIG. 2a the shoulder faces 6 may be divided in a number of sub faces by way of grooves 7 provided in the surfaces, whereby these will be easier to deform resiliently by pressure.

Figure 3:
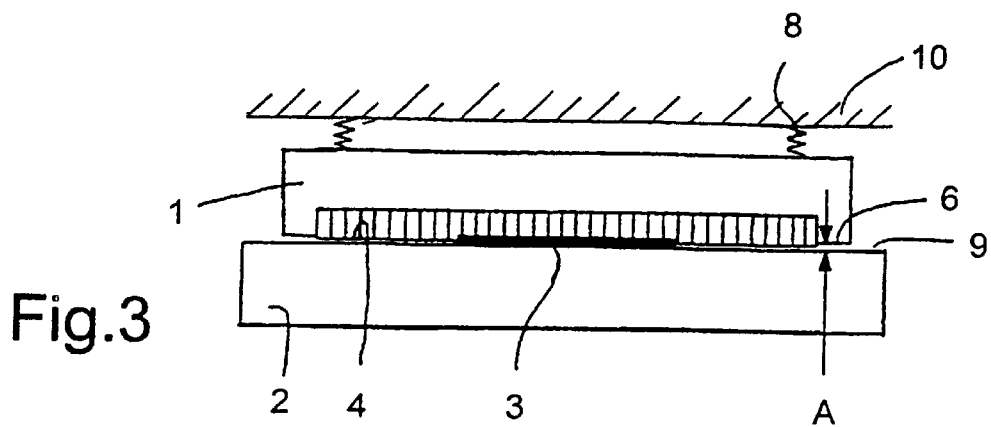
FIGS. 3–5 are front views of different embodiments of the shoulder faces on the knives and the corresponding faces on the anvil in the cutting arrangement.
Figure 4:
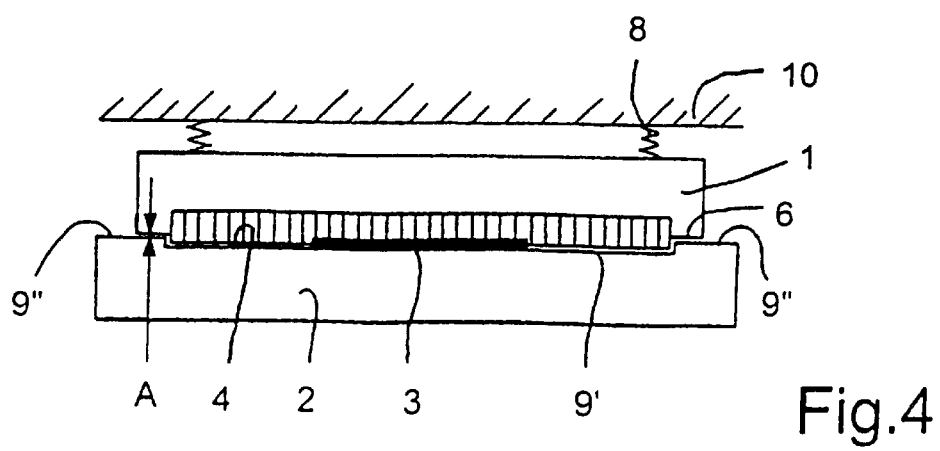
Figure 5:
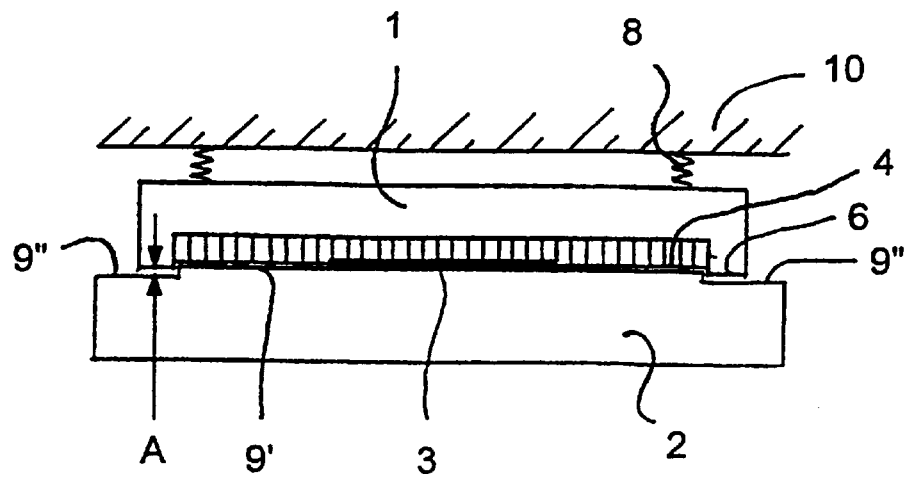

As more clearly shown in FIGS. 3–5 the knife edge 4 may be staggered relative to the shoulder faces, such that these are slightly retracted from the edge 4 as shown in FIGS. 3 and 4, while in FIG. 5 the shoulder faces project slightly in front of the edge.

Generally, the distance designated A between the faces 6 and 9 or 9' and 9", respectively, is the spacing that occurs when the knife edge in unloaded condition rests on the anvil. If the system except for the knife edge is considered to be totally stiff, then this spacing should be the same or a little less than the distance over which it is possible to pressure deform the knife edge purely resiliently, e.g. 0.05 mm. It should be noticed, however, that the system is not entirely stiff, as this may condition that for a continued building up of pressure once the parts 6 and 9 have been brought together, a certain further movement may occur which can contribute to the deformation of the knife edge. In particular when the system is laid out for enabling higher cutting pressures it will be relevant to take into account the resiliency not only of the edge area, but also of the remaining tool parts.

Figure 6:
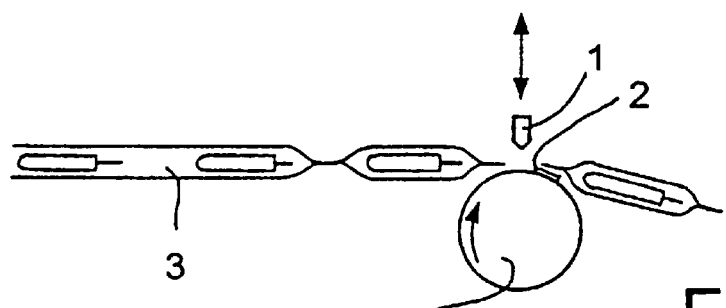
FIGS. 6 and 7 are side views of alternative embodiment of a cutting arrangement according to the invention.
Figure 7:
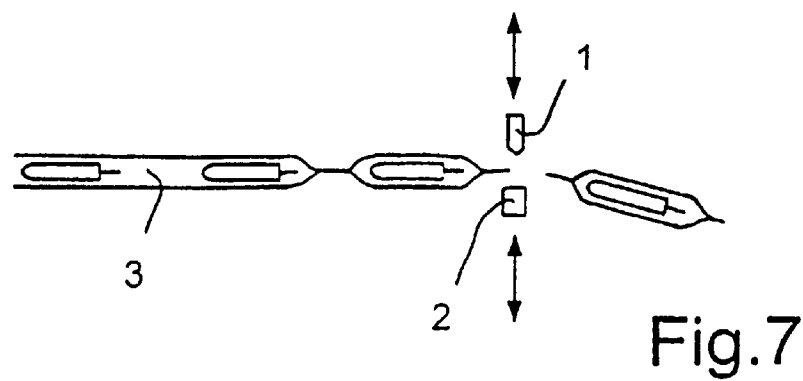

FIGS. 6 and 7 show two alternatives to the arrangement according to FIG. 1. In FIG. 6 the knife 1 is guided in a linear path with the anvil 2 rotating on a backing cylinder 20. Optionally, this cylinder itself could constitute the anvil if made with sufficiently hard surface. In FIG. 7 both the knife and the anvil are guided in a linear manner; here, the anvil could be stationary and only the knife be movable.

What is claimed is:

1. A cutting arrangement for cutting sheet webs by successive cutting through the sheet webs comprising a knife having a sharp edge with a predetermined maximum resilient deformation, an anvil and means for pressing the knife toward the anvil for cutting through the sheet webs; wherein the knife edge has shoulder portions on each of opposite ends thereof; and wherein corresponding abutment portions are provided on the anvil, the shoulder portions of the knife being positioned at a distance relative to the abutment portions on the anvil which causes the shoulder portions on the knife to abut the abutment portions on the anvil subsequent to said knife edge contacting said anvil but before said knife edge deforms to an extent exceeding said predetermined maximum deformation so as to prevent damage to the knife edge upon a full pressing together of the shoulder portions of the knife edge against the abutment portions on the anvil.

2. An arrangement according to claim 1, wherein the parts are so dimensioned that the predetermined maximum resilient deformation of the knife edge amounts to 0.01–0.1 mm.

3. An arrangement according to claim 1, wherein at least one of the shoulder portions and the abutment portions of the anvil have at least one surface groove.

4. An arrangement according to claim 1, wherein the at least one of the knife and the anvil are arranged in a resilient suspension.

5. An arrangement according to claim 1, wherein the anvil has a planar surface, while the shoulders of the knife have shoulder faces located a short distance in front of the knife edge.

6. An arrangement according to claim 1, wherein said shoulders have faces which comprise a plurality of sub-faces separated by grooves.

* * * * *